(12) United States Patent
Cabasse et al.

(10) Patent No.: US 10,176,547 B2
(45) Date of Patent: Jan. 8, 2019

(54) DEVICE AND METHOD FOR CONTROLLING INCOMING VIDEO STREAM WHILE DRIVING

(71) Applicant: Alcatel Lucent, Boulogne Billancourt (FR)

(72) Inventors: Gilbert Cabasse, Brest (FR); Fabrice Bonnaud, Brest (FR)

(73) Assignee: Alcatel Lucent, Boulogne Billancourt (FR)

( * ) Notice: Subject to any disclaimer, the term of this patent is extended or adjusted under 35 U.S.C. 154(b) by 87 days.

(21) Appl. No.: 14/647,550

(22) PCT Filed: Oct. 11, 2013

(86) PCT No.: PCT/EP2013/071304
§ 371 (c)(1),
(2) Date: May 27, 2015

(87) PCT Pub. No.: WO2014/082785
PCT Pub. Date: Jun. 5, 2014

(65) Prior Publication Data
US 2015/0310577 A1    Oct. 29, 2015

(30) Foreign Application Priority Data

Nov. 27, 2012  (EP) .................................... 12306462

(51) Int. Cl.
*G06T 1/20*        (2006.01)
*B60K 37/06*    (2006.01)
(Continued)

(52) U.S. Cl.
CPC ................ *G06T 1/20* (2013.01); *B60K 37/06* (2013.01); *B60R 1/00* (2013.01); *H04N 5/44* (2013.01);
(Continued)

(58) Field of Classification Search
USPC ......................................................... 345/522
See application file for complete search history.

(56) References Cited

U.S. PATENT DOCUMENTS 7,714,704 B1 *  5/2010  Mellen ...................... B60R 1/00
                                                                  340/425.5
2003/0023350 A1    1/2003  Tan et al.
(Continued)

FOREIGN PATENT DOCUMENTS

EP    1 564 582 A2    8/2005
FR    2 870 664 A1    11/2005
(Continued)

OTHER PUBLICATIONS

International Search Report for PCT/EP2013/071304 dated Jan. 20, 2014.

*Primary Examiner* — Barry Drennan
*Assistant Examiner* — Terrell Robinson
(74) *Attorney, Agent, or Firm* — Fay Sharpe LLP (57) ABSTRACT

Various embodiments provide a method and a communication device (2) for controlling incoming video stream in a vehicle (1). Embodiments comprise acquiring at said communication device (2) information related to the vehicle, and enabling or disabling the display of said video stream on said communication device (2) depending on said acquired information.

17 Claims, 4 Drawing Sheets

(51) Int. Cl.
  *B60R 1/00* (2006.01)
  *H04N 5/44* (2011.01)
  *H04N 21/41* (2011.01)
  *H04N 21/414* (2011.01)
  *H04N 21/422* (2011.01)
  *H04N 21/4788* (2011.01)

(52) U.S. Cl.
  CPC ... *H04N 21/4126* (2013.01); *H04N 21/41422* (2013.01); *H04N 21/422* (2013.01); *H04N 21/4788* (2013.01); *B60K 2350/906* (2013.01); *B60K 2350/962* (2013.01); *B60K 2350/967* (2013.01)

(56) References Cited

U.S. PATENT DOCUMENTS

| | | | |
|---|---|---|---|
| 2004/0036764 A1* | 2/2004 | Hirota | G01C 21/3602 348/77 |
| 2005/0179827 A1* | 8/2005 | Scharenbroch | B60K 35/00 349/16 |
| 2006/0155429 A1* | 7/2006 | Boone | B60K 35/00 701/1 |
| 2007/0173234 A1 | 7/2007 | Deprun | |
| 2008/0129684 A1* | 6/2008 | Adams | B60K 35/00 345/156 |
| 2008/0189040 A1* | 8/2008 | Nasu | G08G 1/163 701/301 |
| 2009/0174537 A1* | 7/2009 | Rovik | B60K 35/00 340/438 |
| 2009/0271050 A1* | 10/2009 | Niki | G08G 1/22 701/1 |
| 2010/0079413 A1* | 4/2010 | Kawashima | B60K 35/00 345/175 |
| 2010/0216509 A1* | 8/2010 | Riemer | H04M 1/72577 455/557 |
| 2011/0065375 A1* | 3/2011 | Bradley | H04M 1/72577 455/1 |
| 2011/0093165 A1* | 4/2011 | Miller | B60R 22/48 701/36 |
| 2011/0151853 A1* | 6/2011 | Wang | H04M 1/72577 455/418 |
| 2013/0029650 A1* | 1/2013 | Xiao | H04W 4/027 455/417 |
| 2017/0279957 A1* | 9/2017 | Abramson et al. | H04M 1/72577 |
| 2018/0007554 A1* | 1/2018 | Haley | H04W 48/04 |

FOREIGN PATENT DOCUMENTS

| | | |
|---|---|---|
| JP | 2004-032589 | 1/2004 |
| JP | 2005-094136 | 4/2005 |
| JP | 2006-005744 | 1/2006 |
| WO | WO 2005/112502 | 11/2005 |
| WO | WO 2012/042606 | 4/2012 |
| WO | WO 2012/066677 | 5/2012 |

* cited by examiner

DEVICE AND METHOD FOR CONTROLLING INCOMING VIDEO STREAM WHILE DRIVING

TECHNICAL FIELD

The present invention relates generally to video and vehicles.

BACKGROUND

This section introduces aspects that may help facilitate a better understanding of the invention. Accordingly, the statements of this section are to be read in this light and are not to be understood as admissions about what is prior art or what is not prior art.

Deployment of 3G cellular networks, and also 4G cellular networks in certain countries, combined with development of video-communication softwares, greatly facilitates videoconferencing with mobile communication devices such as smartphones.

One problem with such technologies enabling mobile video conferencing, is that, in the case of driving a car, if the driver receives a video call on his smartphone, he may be tempted to answer that call and watch the video of the caller displayed on the screen of his smartphone.

There is thus a need to reduce the risk of accident while driving a vehicle and having a videoconference call.

SUMMARY

Embodiments described herein are able to prevent the driver from looking at video content on his mobile device while driving conditions are not safe.

In accordance with an aspect of embodiments, it is proposed a method for, within a vehicle, controlling the display of an incoming video stream on the screen of a communication device adapted to receive said video stream, said method comprising:
receiving at said communication device said video stream,
acquiring at said communication device information related to the vehicle,
enabling or disabling the display of said video stream on said communication device depending on said acquired information.

Displaying of video content on the mobile device is thus inhibited while there is a risk for the driver to look at a video content on said mobile device.

According to various embodiments, information related to the vehicle is acquired by said communication device through communicating with a calculator embedded in the vehicle which is connected to vehicle sensors.

In particular embodiments, said communication device is embedded in the vehicle, preferably into the dashboard of the vehicle.

In other embodiments, said communication device is a mobile device, such as a smartphone, that may be removably attached to the dashboard of the vehicle.

In other embodiments, said communication device includes its own information acquisition means for acquiring said information related to the vehicle.

In one aspect, the step of acquiring information comprises detecting a signal related to the running state and/or speed of the vehicle.

In one aspect, step of disabling the display of said video stream includes disabling said display for the driver of the vehicle, while enabling said display for an eventual passenger.

According to another aspect, said communication device being adapted to play an audio stream, said method comprises also the step of enabling playing said audio stream while displaying of said video stream is disabled.

In another aspect, said video stream is part of an incoming multimedia content which also comprises said audio stream.

Preferably, said communication device is adapted to handle a multimedia stream so that it plays the audio sub-stream without displaying the video sub-stream during the periods where unsafe conditions for looking at video are detected.

According to various embodiments, said method also comprises the step of activating or deactivating an operating mode, named driver mode, onto the communication device, for enabling or disabling the control of displaying said video stream on the screen of said communication device.

According to other embodiments, acquiring at said communication device information related to the vehicle, comprises the step of detecting if a communication, such as a Bluetooth® connection, can be established between the mobile device and a system embedded in the vehicle communicating with sensors of the vehicle. In case of a positive answer, said method further comprises acquiring supplemental information related to the vehicle such as vehicle speed, passenger presence, or distance with preceding vehicle. Alternatively, in case of a negative response, said method comprises the step of enabling the display of said video stream on said communication device.

Various embodiments also provide a computer-executable program product comprising computer-executable instructions for performing a method as recited above when the program is run on a communication device capable of executing said computer-executable program product, for, within a vehicle, controlling the display of an incoming video stream on the screen of said communication device which is adapted to receive said video stream.

Various embodiments also concern a communication device comprising a screen and programmed for performing a method as recited above for controlling the display of an incoming video stream on said screen.

Embodiments also provide a vehicle including a calculator which is connected to vehicle sensors for acquiring information related to the vehicle, said vehicle also comprising a communication device as recited above for controlling the display of an incoming video stream on said screen, said communication device being adapted to communicate with said calculator.

Thus, various embodiments provide said communication device with information coming from the vehicle, for instance a car, so it can decide if it is currently safe to display the incoming video stream.

As a result, in the context of driving a car, the user does not need to change any setting. He can get a video call when outside of his car, then enter his car and continue the same conversation, benefiting of the video each time his car is stopped, for instance at a traffic light or in a traffic jam.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

Some embodiments of apparatus and/or methods in accordance with embodiments are now described, by way of example only, and with reference to the accompanying drawings, in which.

DETAILED DESCRIPTION

In accordance with exemplary embodiments, a communication device, a vehicle equipped with said communication device and a method for controlling display of video streams are provided.

Figure 1:
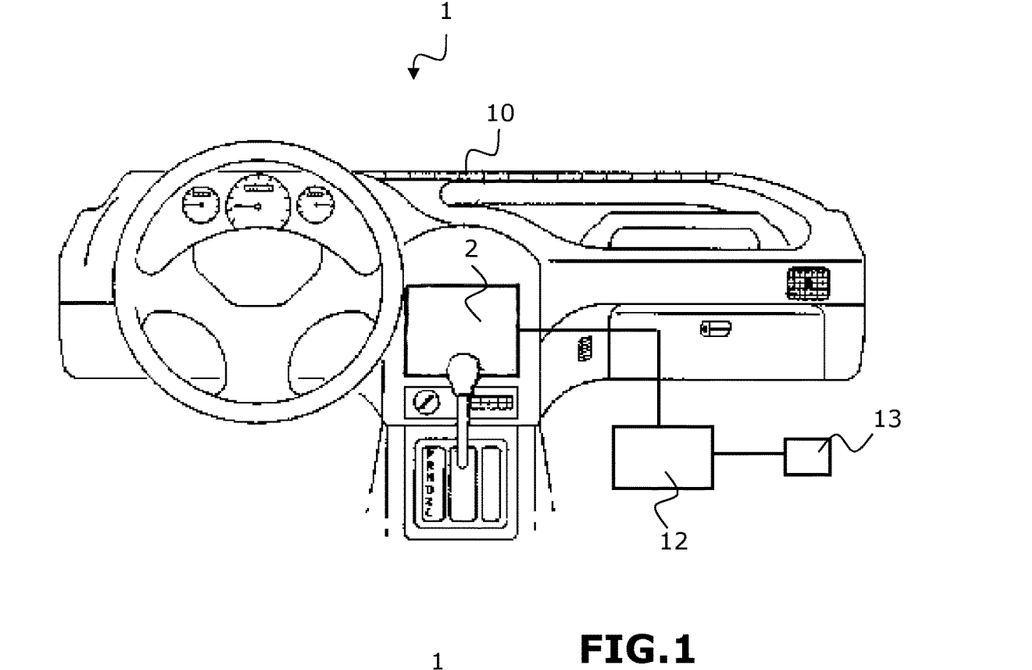
FIG. 1 is a simplified schematic diagram illustrating a vehicle equipped with a communication device according to a first embodiment, wherein said communication device is embedded into the vehicle and is capable of communicating with a calculator associated with sensors.

According to various embodiments and with reference to FIG. 1, the communication device 2 is adapted to receive and transmit multimedia content comprising video and audio streams for establishing videoconference calls between the user of said communication device 2 and distant other interlocutor(s). Streams may be transmitted and received at said communication device 2, through a communication network comprising well known cellular network technologies such as WIMAX, UMTS, GPRS, CDMA2000, GSM, CPD, 3G or 4G technologies.

Said communication device may be of any type of communication device suitable for receiving and sending video and audio streams, including smartphones, tablet computers, personal digital assistant or any other such devices.

Figure 4:
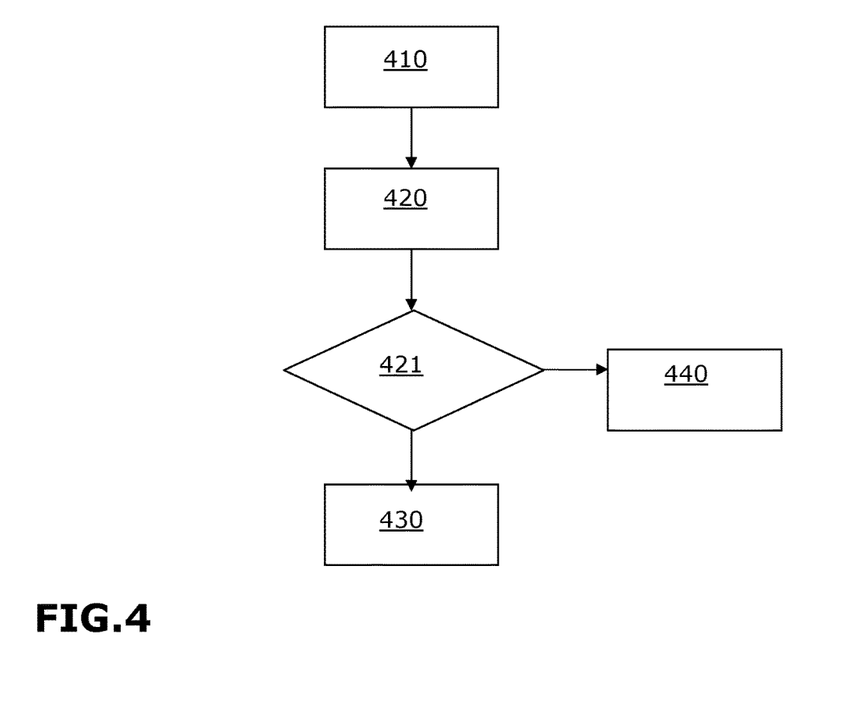
FIG. 4 is a flow diagram illustrating the general steps of a method for controlling displaying of a video stream according to an embodiment, for instance in the context of the vehicle and the communication device of FIG. 1, 2 or 3.

General steps of a method for, within a vehicle 1, controlling the display of an incoming video stream on the screen of said communication device 2, are illustrated hereafter in the case of a user located in a vehicle and with reference to FIG. 4.

At step 410, user of said communication device 2 is in video conversation and receives not only an audio stream but also a video stream from his interlocutor. At step 420, said communication device 2 sends a request for acquiring information related to the vehicle 1.

Said information related to the vehicle may include information depending only on said vehicle, such as speed, but also information depending on its environment, such as a security distance, or the proximity of a dangerous place.

At step 421, said information is analyzed by said communication device 2 which chooses to enabling (step 430) or disabling (step 440) the display of said video stream on said communication device 2 depending on said acquired information. Displaying (step 430) or not displaying the video stream (step 440), may be the result of the activation/deactivation of a device preventing the driver from watching.

In particular, one condition for enabling said display may be that said acquired information be interpreted as a safe context for displaying said video. For instance said information may comprise a signal related to the running state and/or speed of the vehicle. Communication device may be then configured to enable display if said vehicle is at stop and to disable displaying of said video if active running state of the vehicle is detected. Other information may be used or combined to decide enabling or disabling said display. In particular, such signal related to the running state of the vehicle may comprise a signal related to the speed of the vehicle. Communication device may be configured to disable displaying video if said speed exceeds a threshold value of speed.

Displaying video stream may also be conditioned to detecting a signal related to the presence of the passenger and/or to the distance with preceding car.

Said signal may be a signal generated by a system embedded in the vehicle detecting activation of a masking element of the screen which prevents the driver from watching said screen while enabling a passenger to watch said screen.

Presence of a passenger may also be detected by car sensors, such as a sensor associated with the seatbelt of said passenger.

In the case of detecting the presence of a passenger, the screen of said communication device may be oriented in the direction of said passenger. Orientation may be obtained by pivoting said screen or modifying visual orientation of the video stream for example by using stereoscopic technology.

While displaying of said video stream is disabled, various exemplary embodiments enable however playing said audio stream, so that the user may continue his audio conversation.

According to various embodiments, said communication device is configured for offering an operating mode, named driver mode, which may be activated or deactivated onto the communication device. Said driver mode may be activated manually, in particular when said device is a mobile communication device such as a smartphone. When not in driver mode, the device is said in passenger mode. Those two modes may manually be set when the device is not able, by other means, to detect whether the user of that device is the driver or a passenger. In other embodiments said "driver mode" may be activated automatically when communication device communicates with the vehicle or with a vehicle of a predefined list of vehicles, for instance through a calculator 12 connected with vehicle sensors 13.

When activated, said driver mode enables the control of displaying video stream on the screen of said communication device. While disabled, video stream displaying is not controlled and thus said video stream remains displayed.

Figure 5:
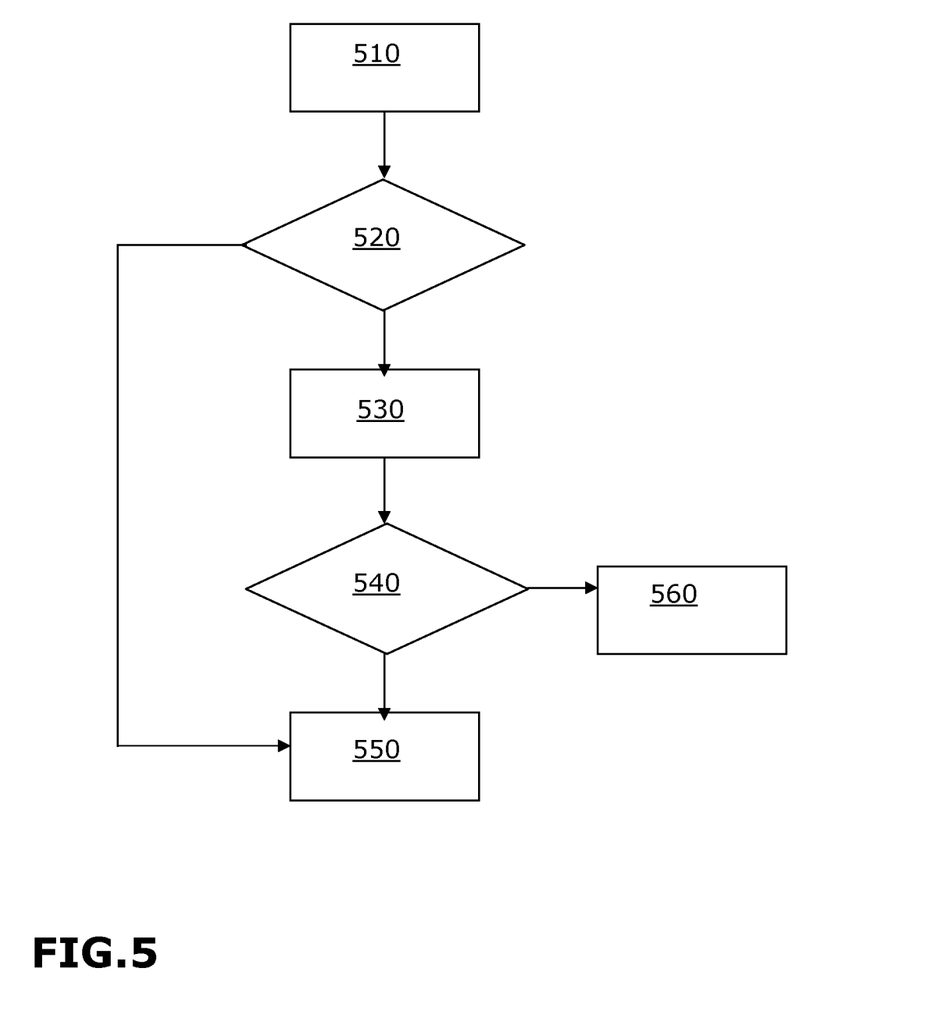
FIG. 5 is a flow diagram illustrating the steps of a method for controlling displaying of a video stream according to another embodiment, for instance in the context of the vehicle and the communication device of FIG. 1, 2 or 3.

Exemplary embodiment of use of such driver mode is illustrated at FIG. 5. Communication device may be configured to execute a process including steps as follows.

At step 510, user of said communication device 2 is in video conversation, or make or take a videocall. At step 520, said communication device 2 determines if said driver mode is activated. In case of negative answer, at step 550, video stream is displayed, while, In case of positive answer, said communication device acquires at step 530 an information related to the vehicle, such as the speed of vehicle, and analyzes at step 540 said information with regard to predefined conditions to determine if information acquired correspond to safe conditions of visioning video stream or not. At step 550, in case of safe conditions, video stream is displayed, while, at step 560, in case of unsafe conditions, video stream is hidden. At the end of steps 550 or 560, the process executed may return to step 520 to regularly check and update the state of the driver mode.

Figure 6:
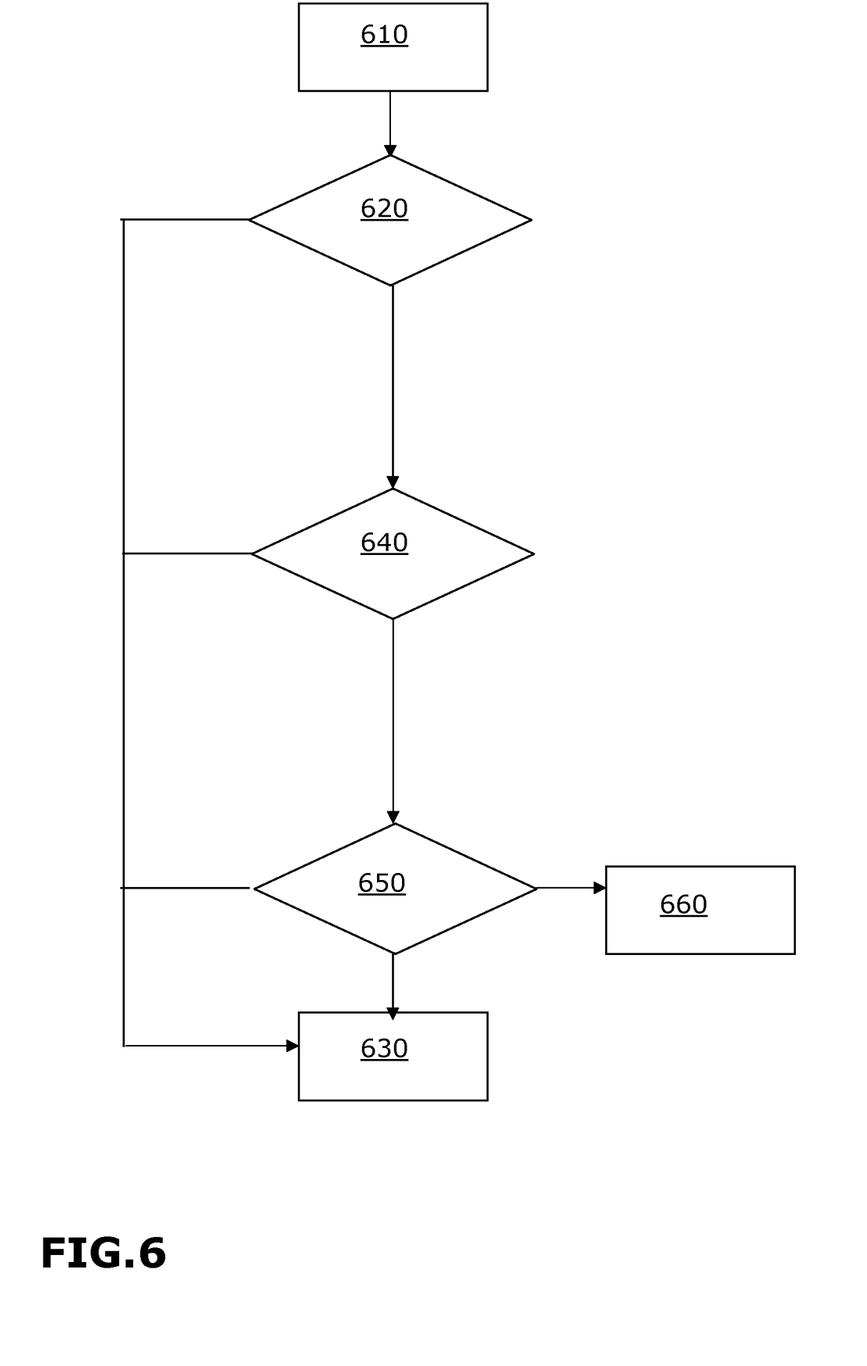
FIG. 6 is a flow diagram illustrating the steps of a method for controlling displaying of a video stream according to another embodiment for instance in the context of the vehicle and the communication device of FIG. 1, 2 or 3.

In other various embodiments illustrated at FIG. 6, the communication device is also configured to execute a process that detects if a communication may be established between said communication device and a calculator embedded in the vehicle. Said communication device uses this information, eventually with other information, to choose between showing or hiding said video stream.

At step 610, user of said communication device 2 is in video conversation. At step 620, said communication device 2 determines if a communication can be established between the mobile device and a system embedded in the vehicle communicating with sensors of the vehicle. Said communication detection may comprise detecting if a wireless connection is available, such as a Bluetooth® connection. For instance, such detection may serve for determining if said communication device is positioned inside the vehicle and/ or if said vehicle is susceptible to be driven by the user, such as a car. Such determination step may thus be used to differentiate a type of vehicle from another type, such as to differentiate a train from a car.

In case of lack of available communication, communication device may be configured, eventually after acquiring supplemental information, to consider that said user is out of the vehicle or is in a vehicle not supposed to be driven by said user. Thus, at step 630, video stream is displayed.

In various embodiments, in case of an available communication between said communication device and the vehicle, said communication device determines at step 640 if the screen of said communication is visible by the driver of the vehicle. Such determination may be realized as explained above by detecting the activation of a masking element or by detecting activation of a stereoscopic solution.

If the result at step 640 is that the driver is unable to view the display on the screen, display of said video stream is enabled at step 630 so that the user-passenger continues benefiting from both video and audio streams. If the result of step 640 is that the driver is capable of viewing the display on the screen, the communication device acquires at step 650 information related to the vehicle and analyses said information to determine if displaying conditions are safe as explained above. In case of unsafe conditions, video stream display is inhibited (step 660) while, in case of safe conditions, displaying of the video stream is enabled (step 630).

Depending on the implementation of the masking device, the communication device could either just detect its activation, or trigger its activation. Then, in the later case, the diagram of FIG. 6 could be modified so that the device always shows the video stream, so it can be viewed by passengers, but activates automatically the masking device when it is determined at step 650 that the video should not be viewable by the driver.

According to an exemplary embodiment, wherein the user is driving a car and wherein the "driver mode" is active, the communication device may be configured to allow incoming calls like a normal phone, while displaying the incoming video stream only when the traffic situation is safe enough for the driver to look at the screen:

typically, when the car is fully stopped,
  or, eventually, when the traffic situation allows some quick glances at the screen, for instance when the driver is respecting the security distance with the preceding vehicle, and when he is not in a urban area, and when there is no crossroad approaching.

With such a communication device, the driver can make or take a call while driving and while reducing the risk of accidents. He may get the voice of his correspondent while his car is not stopped and, when reaching a red traffic light, the video stream may automatically be displayed, until the car starts again.

Figure 2:
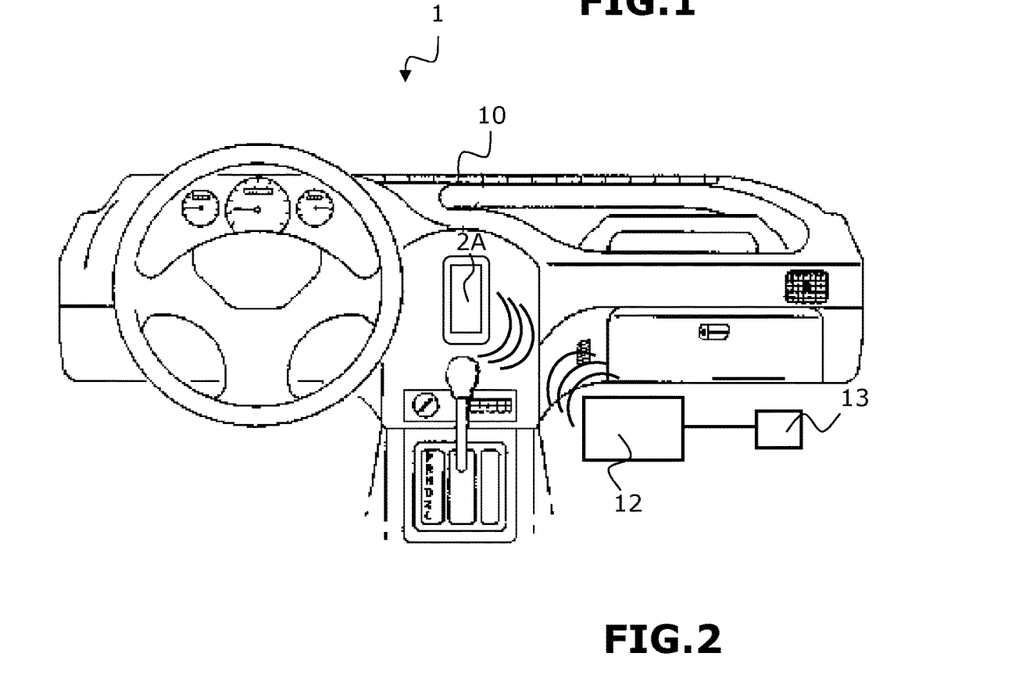
FIG. 2 is a simplified schematic diagram illustrating a vehicle equipped with a communication device according to a second embodiment, wherein said communication device is removably attached to said vehicle and is capable of communicating with a calculator associated with sensors.

In the embodiment illustrated at FIG. 2, the communication device 2A is, like in the embodiment of FIG. 1, capable of communicating with a calculator 12 embedded in the vehicle which is connected to vehicle sensors 13. FIG. 2 differs from FIG. 1 by the fact that, in the embodiment of FIG. 1, said communication device 2 is embedded in the vehicle, preferably into the dashboard 10 of the vehicle 1, while in the embodiment of FIG. 2 communication device 2 is a mobile device 2A, such as a smartphone, that may be removably attached to the dashboard 10 of the vehicle.

Figure 3:
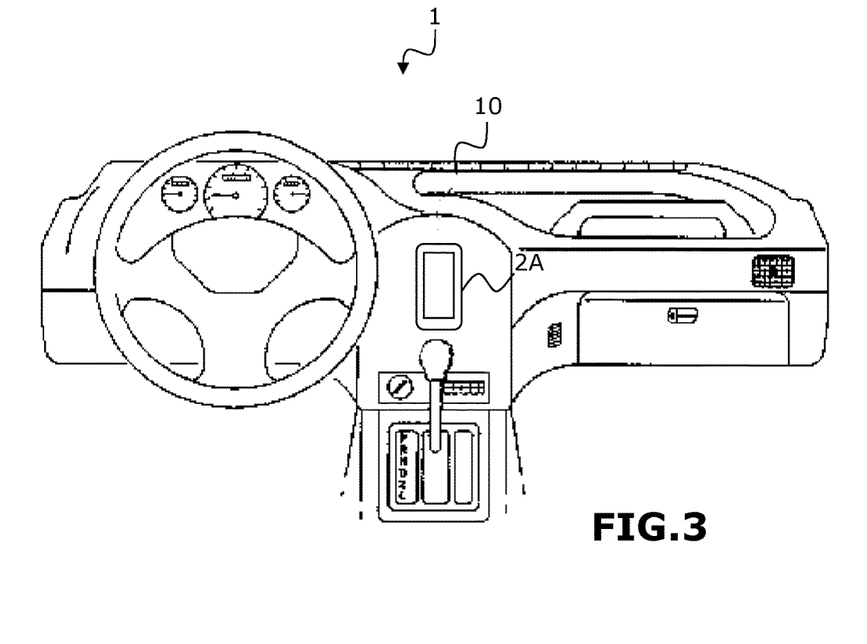
FIG. 3 is a simplified schematic diagram illustrating a vehicle equipped with a communication device according to a third embodiment, wherein said communication device is removably attached to said vehicle and is capable of acquiring, on its own, information related to said vehicle.

Alternatively, as illustrated in the embodiment of FIG. 3, said mobile device may include its own information acquisition means, such a GPS chip, for acquiring said information related to the vehicle. In this case, said mobile device may acquire said information related to the dangerousness of displaying video independently of any system embedded into the vehicle.

A person skill in the art would readily recognize that steps of various above-described methods can be performed by programmed computers.

In particular, said communication device, such as a smartphone or a tablet computer, may comprise a computer or processor or controller to execute instructions for performing said method steps.

The functions of the various elements described above and shown in the figures, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital storage media. The embodiments are also intended to cover computers programmed to perform said steps of methods described herein.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

In various embodiments, particular steps of the methods described above, may be executed in different order. Furthermore, additional steps may also be provided.

The invention claimed is:

1. A method comprising:
controlling, in a vehicle, the display of an incoming video stream on a screen of a communication device configured to receive said video stream, said method further comprising:
receiving at said communication device said video stream,
acquiring at said communication device information related to the vehicle,
enabling or disabling the display of said video stream on said communication device depending on said acquired information,
activating or deactivating a driver mode, on the communication device, for enabling or disabling the control of displaying said video stream on the screen of said communication device, based at least in part on a check whether a person wanting to watch said video stream is a passenger or a driver,
wherein said driver mode is configured to be activated based at least in part on at least one instance of said communication device communicating with said vehicle or with a vehicle of a predefined list of vehicles,
and wherein said driver mode is configured to be manually set at least when the communication device is unable to detect whether the user of the communication device is the driver or the passenger.

2. The method of claim 1, further comprising at least said information related to the vehicle being acquired by said communication device through at least communicating with a calculator embedded in the vehicle which is connected to vehicle sensors.

3. The method of claim 1, wherein the disabling the display of said video stream includes at least in part disabling said display for a driver of the vehicle, while enabling said display for an eventual passenger.

4. The method of claim 1, wherein acquiring at said communication device information related to the vehicle, further comprises at least detecting if a communication, such as Bluetooth® connection, can be established between the communication device and a system embedded in the vehicle communicating with sensors of the vehicle,
and wherein, in case of a communication being established, further comprises at least acquiring at least supplemental information related to the vehicle such as at least one of car speed, passenger presence, or distance with preceding car.

5. The method of claim 4, wherein, in case of a communication not being established, said method further comprises at least enabling the display of said video stream on said communication device.

6. An apparatus comprising:
a screen, and
at least one memory including computer program code and at least one processor,
the at least one memory and the computer program code configured to, with the at least one processor, cause the apparatus at least to:
receive a video stream,
acquire information related to a vehicle,
enable or disable the display of said video stream on said screen depending on at least in part said acquired information
activate or deactivate a driver mode for enabling or disabling the control of displaying said video stream on the screen, based at least in part on a check whether a person trying to watch said video stream is a passenger or a driver,
activate said driver mode based at least in part on at least one instance of said apparatus communicating with said vehicle or with a vehicle of a predefined list of vehicles,
and have said driver mode manually being set when the apparatus is not able to detect whether the user of the apparatus is the driver or a passenger.

7. A non-transitory computer-usable medium storing instructions that when executed by a processor causes an apparatus at least to perform the following:
within a vehicle, controlling the display of an incoming video stream on a screen of said apparatus, which is configured to receive said video stream,
receiving at said apparatus said video stream,
acquiring at said apparatus information related to the vehicle,
enabling or disabling the display of said video stream on said screen of said apparatus depending on at least said acquired information,
activating or deactivating a driver mode, onto the apparatus, for enabling or disabling the control of displaying said video stream on the screen of said apparatus, based at least in part on a check whether a person wanting to watch said video stream is a passenger or a driver,
said driver mode being configured to be activated based at least in part on at least one instance of said apparatus communicating with said vehicle or with a vehicle of a predefined first of vehicles,
and said driver mode being configured to be manually set when the apparatus is not able to detect whether the user of the apparatus is the driver or a passenger.

8. The apparatus of claim 6, wherein said apparatus is embedded in the vehicle, preferably into a dashboard of the vehicle.

9. A vehicle including a calculator which is connected to vehicle sensors for acquiring information related to the vehicle, said vehicle also at least comprising the apparatus of claim 6 for controlling the display of an incoming video stream on said screen of said apparatus, said calculator further being configured to at least communicate with said apparatus.

10. The apparatus of claim 6, wherein the at least one memory and the computer program code are further configured to, with the at least one processor, cause the apparatus at least to further acquire said information related to the vehicle through at least a communication with a calculator embedded in the vehicle which is connected to vehicle sensors.

11. The apparatus of claim 6, wherein said apparatus is a mobile communication device, such as a smartphone, that is removably attached to the dashboard of the vehicle.

12. The apparatus of claim 6, wherein the at least one memory and the computer program code are further configured to, with the at least one processor, cause the apparatus at least to further acquire said information by at least detecting a signal related to at least one of a running state or speed of the vehicle.

13. The apparatus of claim 6, wherein the at least one memory and the computer program code are further configured to, with the at least one processor, cause the apparatus at least to further disable the display of said video stream through at least disabling said display for a driver of the vehicle, while enabling said display for at least one eventual passenger.

14. The apparatus of claim 6, wherein the at least one memory and the computer program code are further configured to, with the at least one processor, cause the apparatus at least to further perform playing an audio stream, such that playing said audio stream can be enabled while displaying of said video stream is disabled.

15. The apparatus of claim 14, wherein the at least one memory and the computer program code are further configured to, with the at least one processor, cause the apparatus at least to further receive said video stream as part of an incoming multimedia content which also comprises at least said audio stream.

16. The apparatus of claim 6, wherein the at least one memory and the computer program code are further configured to, with the at least one processor, cause the apparatus at least to further acquire said information related to the vehicle, by at least:
   detecting if a communication, such as Bluetooth® connection, can be established between the apparatus and a system embedded in the vehicle communicating with sensors of the vehicle,
   and wherein, in case of a communication being established, to acquire at least supplemental information related to the vehicle such as at least one of car speed, passenger presence, or distance with preceding car.

17. The apparatus of claim 16, wherein the at least one memory and the computer program code are further configured to, with the at least one processor, cause the apparatus at least to further perform, in case of said communication not being established, enable the display of said video stream on said screen.

* * * * *